(12) United States Patent
Kuhn et al.

(10) Patent No.: US 6,347,695 B1
(45) Date of Patent: Feb. 19, 2002

(54) DISC CLUTCH

(75) Inventors: Peter Kuhn, Weinheim; Frank Obrist, Dornbirn; Oswald Friedmann, Lichtenau-Ulm, all of (DE)

(73) Assignees: LuK Lamellen, Buhl; Kupplungsbau GmbH, Baden, both of (DE)

(*) Notice: Subject to any disclaimer, the term of this patent is extended or adjusted under 35 U.S.C. 154(b) by 0 days.

(21) Appl. No.: 09/561,503

(22) Filed: Apr. 28, 2000

(30) Foreign Application Priority Data

Apr. 28, 1999 (DE) .......................... 199 19 343

(51) Int. Cl.[7] .......................... F16D 25/04; F16D 13/72
(52) U.S. Cl. ................. 192/70.12; 192/70.2; 192/88 A; 192/106 F
(58) Field of Search ................ 192/70.2, 85 AA, 192/89.25, 88 A, 70.12, 106 F, 113.34

(56) References Cited

U.S. PATENT DOCUMENTS

| | | | |
|---|---|---|---|
| 2,738,864 A | * 3/1956 | Becker | 192/70.2 X |
| 3,862,678 A | * 1/1975 | Collins | 192/88 A |
| 4,126,216 A | * 11/1978 | Babcock et al. | 192/89.25 |
| 4,356,901 A | * 11/1982 | Koehler et al. | 192/70.2 |
| 4,526,258 A | * 7/1985 | Huber | 192/88 A |
| 5,421,439 A | * 6/1995 | Hayasaki | 192/85 AA |
| 5,667,448 A | 9/1997 | Friedmann | |
| 5,865,289 A | * 2/1999 | Ishimaru | 192/106 F X |
| 6,059,682 A | 5/2000 | Friedmann et al. | |

FOREIGN PATENT DOCUMENTS

| | | | |
|---|---|---|---|
| JP | 1-279123 | * | 11/1989 |
| JP | 3-9119 | * | 1/1991 |
| JP | 5-321944 | * | 12/1993 |

OTHER PUBLICATIONS

Equivalent to German Patent DE 198 00 490 A 1 (copy enclosed).

* cited by examiner

Primary Examiner—Rodney H. Bonck
(74) Attorney, Agent, or Firm—Darby & Darby

(57) ABSTRACT

A disc clutch wherein at least one first clutch disc, having internal teeth mating with the external splines of a first rotary hub, frictionally engages at least one second clutch disc, having external teeth mating with the internal splines of a second rotary hub coaxial with the first hub, when the clutch is engaged. Engagement of the clutch takes place in response to actuation of a cylinder-piston unit having a reciprocable piton which can directly or indirectly bear upon one of the two outer discs of the package including the first and second discs. The splines of the hubs and/or the teeth of the clutch discs are capable of undergoing deformation, particularly elastic deformation, to thus facilitate a more accurate selection of the magnitude of torque to be transmitted between the hubs by way of the frictionally engaged clutch discs.

47 Claims, 4 Drawing Sheets

DISC CLUTCH

BACKGROUND OF THE INVENTION

The invention relates to clutches in general, and more particularly to improvements in friction clutches. Still more particularly, the invention relates to improvements in friction clutches of the type known as disc clutches wherein one or more motor- and/or engine-driven first discs can be moved into or from more or less pronounced frictional engagement (including no frictional engagement) with one or more second discs which can transmit torque to one or more driven components, e.g., to the input shaft of a transmission in the power train of a motor vehicle.

A disc clutch can be utilized as a so-called starter clutch in the power train of a motor vehicle, especially in a power train which employs an automatic transmission. A motor vehicle wherein the power train embodies an automatic transmission is disclosed, for example, in German patent application Serial No. 198 00 490. An automatic transmission can be of the type known as a multiple-speed (such as three-, four- or five-speed) transmission or an infinitely (continuously) variable transmission (e.g., the one known as CVT) A power train embodying a starter clutch and a CVT is also disclosed in commonly owned U.S. Pat. No. 5,667,448 granted Sep. 16, 1997 to Oswald FRIEDMANN for "POWER TRAIN".

The disclosure of the commonly owned German priority patent application Serial No. 199 19 343.6-12 filed Apr. 28, 1999 as well as the disclosures of all U.S. and foreign patent applications and/or patents identified in the specification of the present application are incorporated herein by reference.

In many instances, a disc clutch comprises a first set of clutch discs (called friction driving discs) and a second set of clutch discs (often called driven plates) which alternate with the clutch discs of the first set. The means for engaging or disengaging the disc clutch often comprises a so-called apply piston which can be caused to move axially to thus urge the clutch discs of the two sets against each other with a variable force and to thus enable the driving discs to rotate the driven plates without any slip or with a selected slip.

As a rule, the starter disc clutch in the power train of a motor vehicle is operated in two stages. The first stage involves rapid axial displacement of the driving discs through a relatively large distance, e.g., to initiate the transmission of torque to the driven plates or discs. The second stage normally involves precision (minute or small) axial displacements of the driving discs to thus select the desired (optimum) extent of frictional engagement between the neighboring (alternating) driving and driven discs, i.e., to accurately select the magnitude of torque to be transmitted between the prime mover (such as an internal combustion engine) and the driven component(s) (such as the automatic transmission) in the power train of a motor vehicle.

If the output part (such as a camshaft or a crankshaft) of an engine transmits a torque which fluctuates within a certain range, such fluctuations entail corresponding variations of the force which the piston of the clutch engaging/ disengaging assembly transmits to the interfitted (shuffled) driving and driven clutch discs. The force acts at right angles to the planes of the clutch discs, and any variations of such force normally entail an axial displacement of the driving and driven clutch discs (or of all but one clutch disc) relative to the two hubs, one for the driving discs and the other for the driven discs. One of the hubs has axially parallel internal splines mating with the external (peripheral) teeth of one of the two packages of clutch discs, and the other hub has axially parallel external splines mating with the internal teeth of the other package of clutch discs. The teeth of the clutch discs are, or should be, slidable along but should not rotate relative to the splines of the respective hubs. One of the hubs rotates with the output part of the en-engine, and the other hub is non-rotatably connected with the input element of the transmission.

Whenever the teeth of a clutch disc move along the neighboring splines of the respective hub, this invariably involves the generation of a certain amount of friction. The friction is not constant because its magnitude is a function of the forces acting in the circumferential direction of the clutch discs (i.e., of the magnitude of transitted torque) as well as of the so-called friction factor at the loci of frictional engagement between the teeth of a clutch disc and the splines of the respective hub.

Under ideal circumstances, any changes of pressure of oil or another pressurizable fluid which is employed to move the clutch engaging/disengaging piston axially should result in corresponding predictable axial displacements of the piston and hence in corresponding predictable changes (modulation) of frictional engagement between the driving and driven clutch discs. It has been ascertained that presently known disc clutches fail to satisfy such exacting requirements, and an important reason for such absence of predictability of the magnitude of transmitted torque is the unpredictability of the extent of frictional engagement between the (internal or external) teeth of the clutch discs on the one hand, and the (external or internal) splines of the respective hubs on the other hand. All the aforementioned second stage of operation of a conventional clutch disc normally involves are hysteresis losses rather than an accurate selection of a desired modulation of the torque being transmited between neighboring driving and driven clutch discs.

Conventional disc clutches exhibit certain additional drawbacks. For example, unpredictable frictional engagement between the teeth of the clutch discs and the splines of the respective hubs entails non-uniform wear upon such parts with the resultant generation of noise, escape of lubricant and/or the need for frequent inspection and replacement of parts.

OBJECTS OF THE INVENTION

An object of the present invention is to provide a disc clutch which is constructed and assembled in such a way that it can select the magnitude of transmitted torque with a degree of accuracy much higher than that achievable with presently known disc clutches.

Another object of the invention is to provide a disc clutch wherein the interfitted driving and driven clutch discs invariably respond to any and all desired or required changes in the action of the clutch engaging/disengaging arrangement.

A further object of the invention is to provide novel and improved discs for use in a clutch of the above outlined character.

An additional object of the invention is to provide a power train, particularly a power train for use in a motor vehicle, which embodies one or more disc clutches of the above outlined character.

Still another object of the invention is to provide a novel and improved method of transmitting torque between the internal combustion engine and the transmission (such as an automatic transmission) of a motor vehicle.

A further object of the invention is to provide the disc clutch with novel and improved means for shielding the piston of the clutch engaging/disengaging arrangement from corrosive and/or other undesirable influences of the fluid which is employed to shift the piston in its cylinder in order to change the magnitude of the torque which is to be transmitted by the clutch.

Another object of the invention is to provide a disc clutch wherein the exact magnitude of torque which is being transmitted between the two hubs is less dependent upon the magnitude of friction between the teeth of the clutch discs and the splines of the respective hubs than in heretofore known and utilized disc clutches.

An additional object of the invention is to provide novel and improved means for engaging and disengaging a disc clutch.

Still another object of the instant invention is to provide a disc clutch wherein the coolant for the clutch discs can be put to additional advantageous uses.

A further object of the invention is to provide novel and improved means for shielding the apply piston in the engaging/disengaging arrangement of a disc clutch.

Another object of the invention is to provide a simple, compact and relatively inexpensive disc clutch which exhibits the above-enumerated desirable and advantageous characteristics.

An additional object of the invention is to provide a disc clutch the useful life of which is longer than that of conventional disc clutches and which requires less maintenance work than presently known disc clutches.

Still another object of the invention is to provide a novel and improved starter clutch for use in the power trains of motor vehicles, for example, immediately downstream of the rotary output part of a motor, an engine or a hybrid prime mover.

A further object of the invention is to provide a disc clutch which is more compact than heretofore known disc clutches as seen in the axial and/or radial direction of its constituents including the clutch discs and the hubs for the clutch discs.

SUMMARY OF THE INVENTION

One feature of the present invention resides in the provision of a disc clutch which comprises a first hub having external splines and being rotatable about a predetermined axis (e.g., about the common axis of the rotary output part of an engine and the input shaft of a transmission in the power train of a motor vehicle), a second rotary hub which spacedly surrounds and is coaxial with the first hub and has internal splines, first friction generating means including at least one first annular clutch disc having a set of internal teeth which mate with the external splines of the first hub, second friction generating means including at least one second annular clutch disc having a set of external teeth which mate with the internal splines of the second hub, and operating means which is actuatable to engage and disengage the clutch. The operating means includes means for biasing the clutch discs against each other. In accordance with a feature of the invention, the teeth of at least one set of teeth are deformable (in accordance with a presently preferred embodiment, all teeth are resilient, i.e., elastically deformable). The teeth of at least one of the discs are movable (along the respective splines) axially of the corresponding hubs.

If each of the two friction generating means comprises a plurality of clutch discs, the clutch discs of one friction generating means alternate with the clutch discs of the other friction generating means, and all clutch discs (with the possible exception of the outermost disc remotest from a reciprocable piston of the aforementioned biasing means) are movable axially relative to each other and relative to the respective hubs. Though it is possible to operate with a single first clutch disc and a single second clutch disc, the improved disc clutch can employ an entire package of coaxial clutch discs; the plural first discs and the plural second discs of such package alternate as seen in the direction of their common axis.

In accordance with a presently preferred embodiment, the biasing means of the clutch operating means comprises at least one fluid-operated cylinder and piston unit, preferably a unit which operates with a hydraulic fluid.

The teeth of at least one set of teeth are or can be deformable in the direction of the common axis of the hubs and clutch discs.

It is often sufficient if only the internal teeth or only the external teeth are resiliently deformable. The internal teeth of the first clutch disc(s) extend radially inwardly beyond an internal surface of each such disc and mesh with the adjacent external splines of the first hub, and the external teeth of the second disc(s) extend radially outwardly beyond an external surface of each such disc and mate with the adjacent internal splines of the second hub.

The external teeth and/or the internal teeth can be a tight sliding fit between the respective internal and/or external splines. Otherwise stated, the external and/or the internal teeth can be dimensioned and configured in such a way that they are in wobble-free mesh with the respective pairs of (neighboring) splines.

Each clutch disc has an annular main section from which the teeth extend radially outwardly or radially inwardly. The teeth can be of one piece with the respective annular sections, and the thickness of the teeth (as seen in the axial direction of the disc clutch) can be different from (as a rule less than) the thickness of the respective annular section.

The teeth can merge radially into the respective annular sections, namely in such a way that the cross sectional area of each tooth decreases in a direction away from (the internal or peripheral surface of) the respective annular section. Furthermore, the teeth can be configured and dimensioned in such a way that each tooth includes a first portion which is affixed to (e.g., of one piece with) the respective annular section and a second portion which extends from the respective first portion substantially in a circumferential direction of the respective disc; the second portions of the teeth can be separated from the adjacent internal or external surfaces of the respective annular sections by narrow slots or gaps of constant width of varying width. The first portion each tooth can taper in a direction substantially radially of the axis of the clutch and away from the internal or external surface of the respective annular section.

As a rule, the dimensions of the teeth and of the splines are selected in such a way that the external surfaces or faces of the teeth exert pressure upon but are still slidable along the neighboring splines of the respective hubs; the clutch preferably further comprises means for reducing the pressure between the tooth faces of at least one set of teeth and the respective splines. Such pressure reducing means can comprise elastic films on the faces of at least some of the teeth. Alternatively, or in addition to the elastic films, the pressure reducing means can include the aforementioned second portions of the teeth constituting the aforementioned at least one set of teeth.

The teeth of at least one set of teeth can contain or consist of spring steel. Moreover, the at least one second clutch disc or each second clutch disc can comprise friction linings which frictionally engage the at least one first clutch disc or the neighboring one of two or more first clutch discs, at least when the clutch is at least partially engaged. The first clutch disc or discs can be devoid of friction linings.

The aforementioned at least one fluid-operated cylinder and piston unit of the means for biasing the clutch discs against each other in the at least partially engaged condition of the clutch can be designed to define a plenum chamber for a hydraulic fluid which is admitted into the chamber in order to at least partially engage the clutch, and the biasing means can further comprise a membrane which is disposed in the chamber between the supply of fluid and the reciprocable piston. It is presently preferred to employ an at least substantially annular membrane having a marginal portion which is maintained in sealing engagement with the cylinder of the cylinder and piston unit in a region between the piston and the supply of fluid in the plenum chamber.

The aforementioned marginal portion or each of the two marginal portions of the annular membrane can be provided with a bead or an analogous thickened zone which sealingly engages the cylinder, e.g., by extending (by snap action and/or otherwise) into an annular socket of the cylinder.

The membrane can be provided with at least one annular corrugation which is adjacent the piston, and such corrugation can be provided in the membrane before the latter is installed in the cylinder and piston unit.

The dimensioning and the manner of mounting the membrane in the cylinder and piston unit can be such that the properly installed membrane is movable in the axial direction of the disc clutch through a distance of up to about 5 mm (preferably of up to about 4 mm) in response to movement of the piston relative to the cylinder in a direction to pressurize the supply of fluid in the plenum chamber, i.e., to engage the disc clutch to a desired or required extent.

The entire membrane, or at least a substantial (such as major) portion of the membrane, can have a thickness of approximately 0.8 mm. The membrane can consist of an elastomeric material, such as fluorosilicone caoutchouc. Alternatively, the membrane can be made of a metallic material. If the membrane is made of or contains an elastomeric material, it can contain reinforcing means, for example, glass fibers and/or other filamentary reinforcing material.

The fluid in the plenum chamber of the cylinder and piston unit is being acted upon by centrifugal force and/or is otherwise influenced (when the disc clutch rotates) in a sense to undesirably affect the extent of engagement or disengagement of the clutch. In order to eliminate or lessen such influence(s), the disc clutch can further comprise means for counteracting any undesirable or non-controllable bias upon the piston, namely a bias which would or could affect the accuracy of engagement or disengagement of the clutch (i.e., which could cause the actual extent of engagement or disengagement of the clutch to deviate from the desired optimum extent).

The counteracting means can define a second chamber which is or can be provided in the cylinder and piston unit of the biasing means, and a supply of a fluid medium in the second chamber. Such fluid medium is being acted upon by centrifugal force when the two hubs rotate to thus bias the piston counter to the direction in which the piston is urged by the fluid in the plenum chamber (not as a result of admission of fluid into the plenum chamber but rather as a result of undesirable influences (such as by centrifugal force) upon the fluid in the plenum chamber). The supply of fluid medium in the second chamber can constitute a coolant for the clutch discs, and the clutch then further comprises means for directing the coolant into heat-exchanging contact with the discs.

The counteracting means can further include a piston member which is provided in the cylinder and piston unit adjacent the second chamber. The effective (fluid-contacting) surface of the piston member can match or approximate the effective surface of the piston which serves to vary the pressure of fluid in the plenum chamber. The piston member is acted upon by the fluid medium in the second chamber to oppose the bias upon the piston of the cylinder and piston unit when the hubs are caused to rotate.

The piston member of the aforementioned counteracting means can include or constitute a diaphragm spring which biases the piston of the cylinder and piston unit counter to the direction in which the piston is caused to move in order to urge the clutch discs against each other with an increasing force. The diaphragm spring can be designed in such a way that it includes a circumferentially complete annular portion and tongues or prongs extending from the annular portion at least substantiallly radially toward the axis of the disc clutch. The prongs define slots which are preferably filled by a suitable sealant. The sealant can coat at least a portion of at least one side of the diaphragm spring. Such sealant can contain an elastomeric material, e.g., fluorosilicone caoutchouc. It is often preferred to apply the sealant to one side of the diaphragm spring, at least in the region of the aforementioned tongues or prongs.

One or more sealing devices (e.g., in the form of washers or the like) can be provided to cooperate with the piston of the cylinder and piston unit and/or with the diaphragm spring (second piston) to at least partially seal the second chamber from the surrounding atmosphere.

Another feature of the invention resides in the provision of a disc clutch which comprises a first hub having external splines and being rotatable about a predetermined axis, a second rotary hub which spacedly surrounds and is coaxial with the first hub and has internal splines parallel to the axis and to the external splines, first friction generating means including at least one first annular clutch disc having a set of internal teeth which mate with the external splines of the first hub, second friction generating means including at least one second annular clutch disc having a set of external teeth mating with the internal splines of the second hub, and operating means which is actuatable to engage and disengage the clutch and includes means for biasing the first and second clutch discs against each other. The biasing means comprises at least one cylinder and piston unit including a movable piston and defining a plenum chamber for a supply of fluid (such as oil). The cylinder and piston unit further comprises a membrane which is disposed in the plenum chamber between the supply of fluid and the piston.

A further feature of the invention resides in the provision of a disc clutch which comprises a first hub having external splines and being rotatable about a predetermined axis, a second rotary hub spacedly surrounding and being coaxial with the first hub and having internal splines, first friction generating means including at least one first annular clutch disc having a set of internal teeth mating with the external splines of the first hub, second friction generating means including at least one second annular clutch disc having a set of external teeth mating with the internal splines of the second hub, and operating means which is actuatable to engage and disengage the clutch and includes means for biasing the discs against each other. The biasing means comprises at least one fluid-operated cylinder and piston unit having a plenum chamber for a supply of hydraulic fluid serving to (directly or indirectly) bear upon the reciprocable piston of the cylinder and piston unit and to thus shift the piston in the cylinder of the cylinder and piston unit in the direction of the predetermined axis to thus at least partially engage the clutch. The fluid in the plenum chamber is being acted upon by centrifugal force and/or is subjected to other influences, at least when the hubs rotate, to thus bias the piston in the aforementioned direction, and the improved disc clutch further comprises means for counteracting the (undesirable) bias upon the piston.

An additional feature of the invention resides in the provision of a disc clutch which comprises a first component including a first hub having external teeth and being rotatable about a predetermined axis and a second rotary hub spacedly surrounding and being coaxial with the first hub and having internal teeth (the just discussed teeth can constitute elongated axially parallel splines of the respective hubs), and a second component comprising first friction generating means including at least one first annular clutch disc having internal teeth mating with the external teeth of the first hub and second friction generating means including at least one second annular clutch disc having external teeth mating with the internal teeth of the second hub. The teeth of at least one of the first and second components (i.e., of the hubs and/or of the discs) are at least partially deformable (preferably elastically deformable), and the teeth of the clutch discs are movable relative to the teeth of the respective hubs. The disc clutch further comprises operating means which is actuatable to at least partially engage and disengage the clutch, and such operating means includes means for biasing the clutch discs against each other.

The novel features which are considered as characteristic of the invention are set forth in particular in the appended claims. The improved disc clutch itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
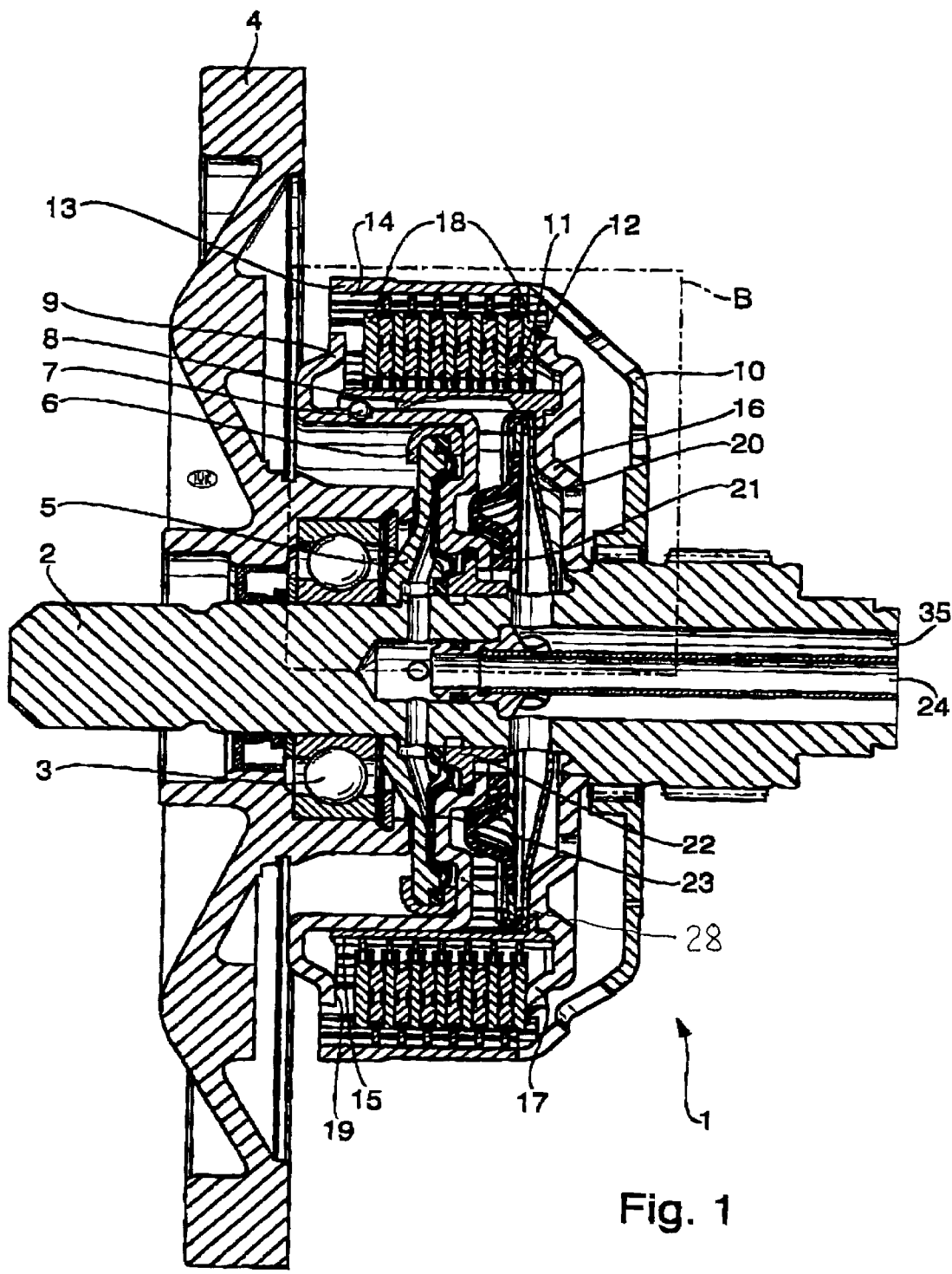
FIG. 1 is an axial sectional view of a disc clutch which embodies one form of the present invention.
Figure 2:
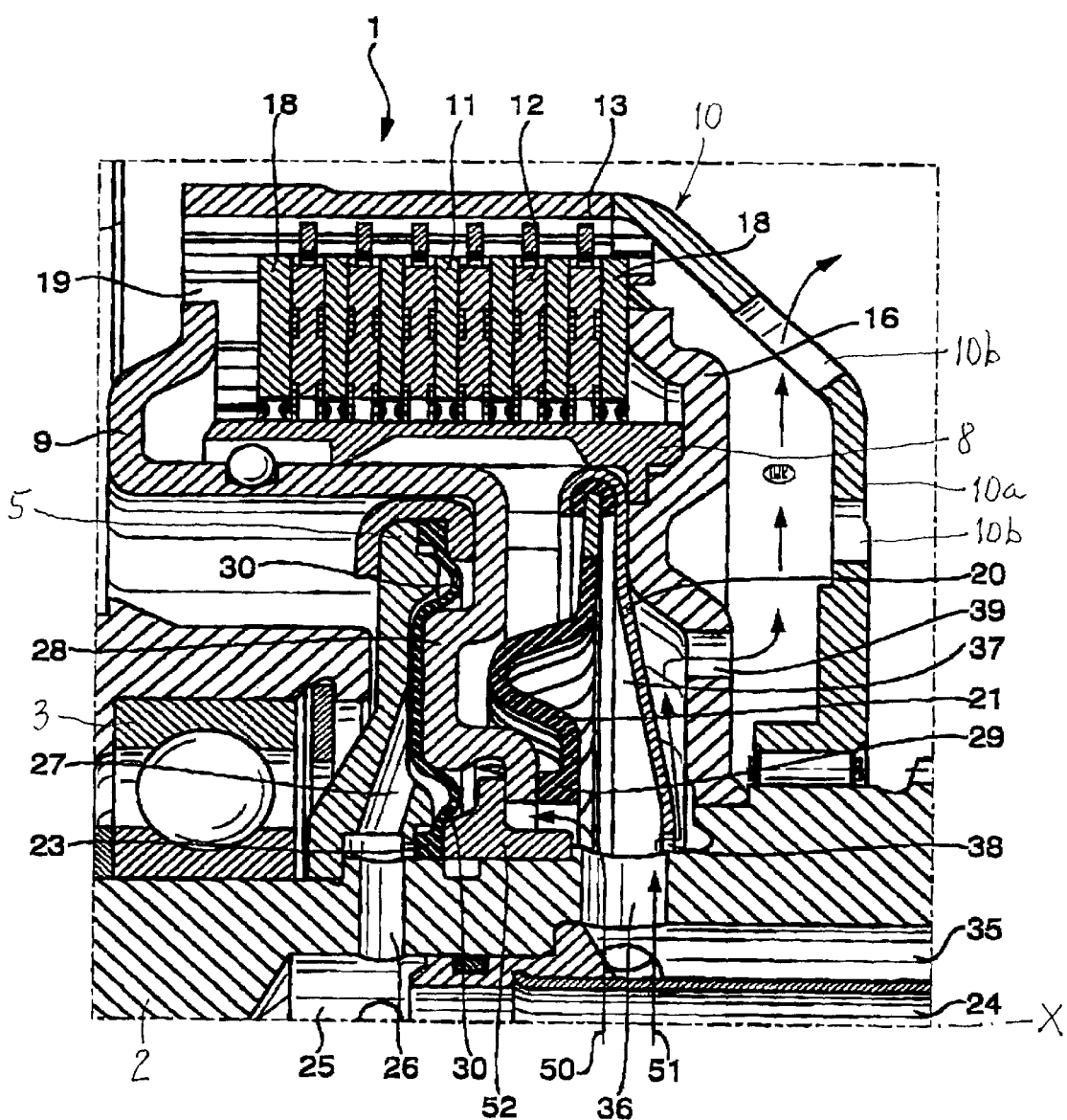
FIG. 2 is an enlarged view of the detail within the phantom-line square B in FIG. 1.

FIGS. 1 and 2 show certain relevant parts of a disc clutch 1 mounted on a shaft 2 which is rotatable in several antifriction bearings including a ball bearing 3 installed in a housing including a cover 4. The shaft 2 can further carry a planetary transmission (not shown) or one adjustable pinion of a continuously variable transmission (CVT), e.g., a transmission of the type disclosed in the aforementioned commonly owned U.S. Pat. No. 5,667,448 to Friedmann. The clutch 1 can cooperate with a second clutch (not shown) which is disposed radially outwardly of the clutch 1 and is engaged when the motor vehicle having a power train which embodies the clutch 1 is to be driven in reverse. Reference may be had again to the aforementioned published German patent application Serial No. 198 00 490.

The character 5 denotes a circular flange which is adjacent the inner race of the ball bearing 3 and has an axial bore for the shaft 2. The radially outermost portion of the flange 5 is surrounded by an annular member 6 which can be made of sheet metal and has a U-shaped cross-sectional outline. A ball 7 is received in an axially parallel internal groove of a first substantially cylindrical hub 8 and serves to hold the hub against angular movements relative to a pressure plate or piston 9. The hub 8 is free to move axially of the shaft 2.

The clutch 1 further comprises a bell-shaped housing or casing 10 which confines two sets of coaxial annular clutch discs 11 and 12. The cylindrical portion 13 of the housing constitutes a second hub which is coaxial with and spacedly surrounds the hub 8. The hub 13 has axially parallel internal splines or teeth 14 which mate with the external teeth 32 (see FIG. 5) of the clutch discs 12. The hub 8 has axially parallel external splines or teeth 15 which mate with the internal teeth 31 (see FIGS. 3 and 4) of the clutch discs 11. The discs 11 alternate with the discs 12 as seen in the axial direction of the shaft 2, and the clutch 1 is at least partially engaged when the radially extending major surfaces of the discs 11 are in frictional engagement with the adjacent radially extending major surfaces of the discs 12 so that the hub 8 can rotate the hub 13 or vice versa.

An annular stop 16 surrounds the shaft 2 in the interior of the housing 10, and its radially outer portion 17 serves as an abutment for the adjacent one of two end discs 18, namely for the adjacent outermost disc 11. The other end disc 18 (i.e., the leftmost disc 11, as viewed in FIG. 1 or 2), can be moved toward the abutment 17, to thus engage the clutch 1, by the annular surface 19 of the pressure plate 9.

A cupped or dished annular member 20 is inwardly adjacent the annular stop 16 and is disposed within the hub 8 for the clutch discs 11. The radially outermost portion of the member 20 surrounds the annular radially innermost portion 41 (see FIG. 6) of a diaphragm spring 21. A supporting ring 22 serves to locate the radially innermost portion of a deformable membrane 23 which is disposed between the piston 28 of a cylinder and piston unit wherein the aforementioned flange 5 constitutes one end wall of the cylinder. The radially outer portion of the membrane 23 is maintained in sealing engagement with the end wall or flange 5 by the aforementioned annular member 6. The median portion of the membrane 23 has several concentric corrugations 30 and overlies the left-hand side of the piston 28 so that the latter is not in direct contact with a supply of hydraulic fluid (e.g., oil) in an annular plenum chamber 27 between the flange 5 and the membrane 23. If the plenum chamber 27 receives pressurized hydraulic fluid by way of one or more radial ports 26 provided in the shaft 2, the piston 28 is moved in a direction to the right and causes the annular surface 19 of the pressure plate 9 to urge the clutch discs 11, 12 against each other with a selected force to thus select the extent of frictional engagement between the abutting surfaces of the clutch discs, i.e., to select the extent of engagement of the clutch 1.

The port or ports 26 communicates or communicate with the end portion 25 of an axial channel 24 in the shaft 2. The channel 24 can receive fluid from a suitable pump, not shown (reference may be had again to the '448 patent to Friedmann). The radially inner portion of the piston 28 is engaged by a sealing member 29 which can be mounted on or is simply biased by the diaphragm spring 21.

Axial movements of the piston 28 in a direction to the right (i.e., to engage the clutch 1) are opposed by the diaphragm spring 21. The corrugations 30 of the membrane 23 and the selected thickness (preferably not in excess of 0.8 mm) of the membrane ensure that the actuation of the piston 28 takes place with a minimum of friction, i.e., in the absence of hysteresis. This is desirable and advantageous because it enables the piston 28 (which is or which can be of one piece with the pressure plate 9) to move the annular surface 19 of the pressure plate to a selected axial position with a high degree of precision, predictability and reproducibility.

FIG. 2 shows the disc clutch 1 in the disengaged condition because the annular surface 19 of the pressure plate 9 is spaced apart from the adjacent outermost disc 18 (i.e., from the leftmost disc 11). For example, the pressure in the plenum chamber 27 can be regulated in such a way that the leftmost or outermost disc 18 of FIGS. 1 and 2 is shifted by increments amounting to minute fractions (e.g., tenths or even less than tenths) of the maximum extent of movability of the left-hand outermost disc 18 in the axial direction of the shaft 2. The sensitivity of the means for operating the clutch 1 (i.e., of the cylinder and piston unit including the parts 5 and 28) is enhanced due to the novel design of teeth 31 and 32 which are slidable along the adjacent pairs of splines 15 and 14. These splines are parallel with the axis X of the disc clutch 1.

If the operator of the motor vehicle having a power train which embodies the disc clutch 1 (or an automatic control system for the clutch) is to effect a slight change in the extent of engagement of the clutch, i.e., a slight change in the magnitude of torque being transmitted by the clutch, the aforementioned pump is caused to force a selected quantity of hydraulic fluid into the axial channel 24 of the shaft 2 (it is assumed here that the magnitude of the transmitted torque should be increased). The fluid enters the plenum chamber 27 by way of the radial port or ports 26 communicating with the end portion 25 of the channel 24 which, in the illustrated embodiment, is a blind axial bore in the shaft 2. The inflowing fluid moves the piston 28 of the cylinder and piston unit axially in a direction to the right (as viewed in FIGS. 1 and 2) whereby the annular surface 19 of the pressure plate 9 displaces the adjacent outermost disc or lamination 18. Thus, the thickness of the package of alternating clutch discs 11, 12 is reduced because the right-hand outermost disc 18 abuts the radially outer annular portion 17 of the axially fixed stop 16.

The discs 11 and 12 are held against angular movement relative to the respective hubs 8 and 13 because each external tooth 31 of the disc 11 is confined to movement along the abutting faces of the respective pair of external splines or teeth 15 on the hub 8 and each external tooth 32 of each disc 12 is confined to movement along the abutting faces of the respective pair of internal splines or teeth 14 forming part of the hub 13. In accordance with an important feature of the invention, the splines 14, 15 and/or the teeth 31, 32 are deformable. The deformability is attributable to elasticity of the splines 14, 15 and/or teeth 31, 32. It is presently preferred to provide the clutch discs 11 and 12 with elastically deformable teeth 31 and 32, respectively.

The ability of the teeth 31, 32 to undergo elastic deformation renders it possible to achieve minute changes of the magnitude of forces acting between the abutting surfaces of neighboring clutch discs 11, 12 even if the deformable teeth 31, 32 do not slide in the axial direction of the shaft 2. The extent to which the magnitude of the forces acting upon the abutting surfaces of the clutch discs 11 and 12 varies without actual shifting of the teeth 31, 32 along the neighboring pairs of splines 15, 14 depends upon the resiliency and configuration of the teeth 31, 32 as well as upon the magnitude of frictional forces acting between such teeth and the neighboring splines. Thus, an important feature of the present invention resides in that the magnitude of the torque being transmitted or to be transmitted from the clutch discs 11 to the clutch discs 12 or vice versa can be varied while the axial positions of the teeth 31, 32 relative to the adjacent pairs of splines 15, 14 remain unchanged. This greatly enhances the ability of the clutch 1 to vary the magnitude of transmitted torque with a heretofore unmatched degree of precision.

Figure 3:
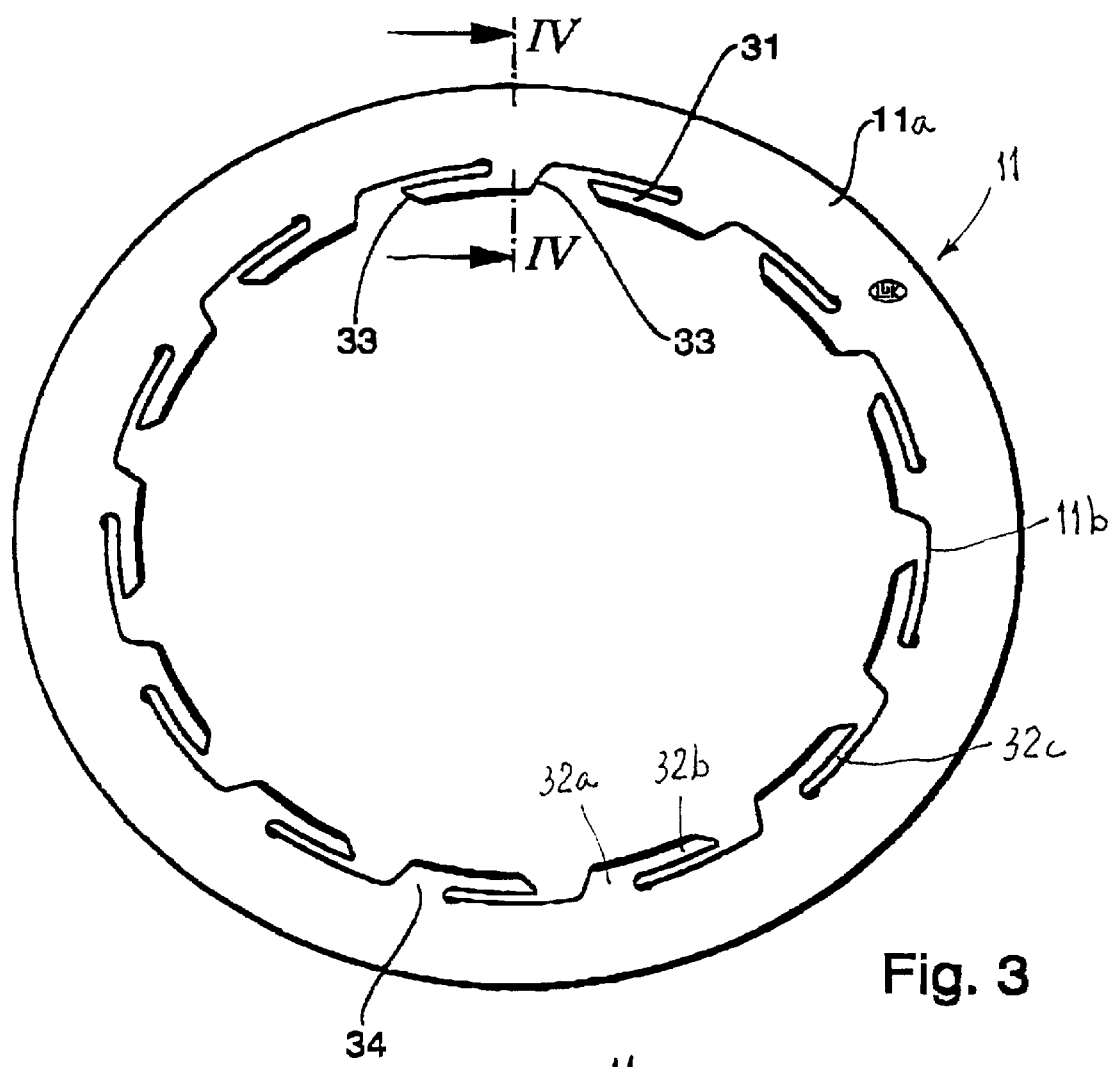
FIG. 3 is an elevational view of one of the clutch discs having internal teeth.
Figure 4:
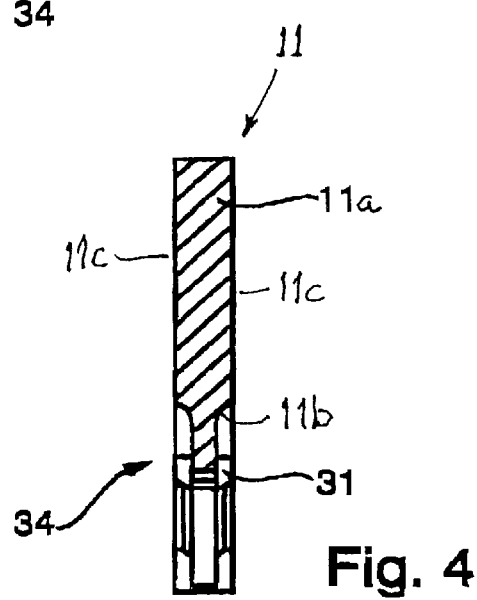
FIG. 4 is an enlarged fragmentary axial sectional view as seen in the direction of arrows from the line IV—IV in FIG. 3.
Figure 5:
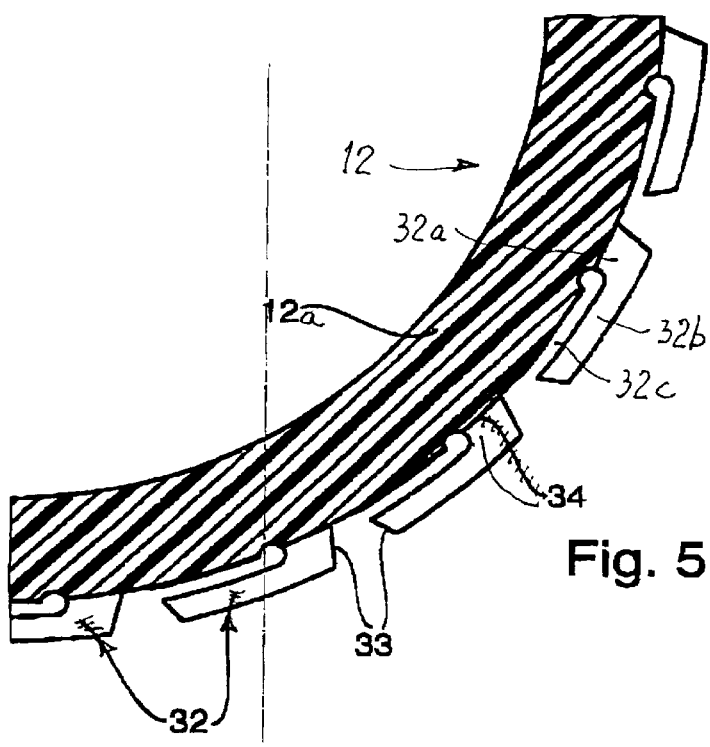
FIG. 5 is an enlarged fragmentary partly elevational and partly sectional view of one of the clutch discs having external teeth.

The characters 34 denote in FIGS. 3–4 and 5 those lateral faces of the teeth 31, 32 which are in frictional engagement with the longitudinally extending faces of the adjacent splines, 15, 14, respectively. The faces 34 can be maintained in rather pronounced frictional engagement with the faces of the splines 14, 15 so that no axial displacement of the teeth 31, 32 will take place or must take place in response to an increase of fluid pressure in the plenum chamber 27; nevertheless, the thickness of the package of clutch discs 11, 12 can be varied to an extent which depends upon the extent of deformability of the teeth 31, 32 and upon the extent of initial frictional engagement between the teeth 31, 32 and the adjacent splines 15, 14. Otherwise stated, minute changes of the magnitude of transmitted torque can be achieved without it being necessary to overcome friction prevailing between the teeth 31, 32 and the neighboring splines 15, 14 because the magnitude of forces acting upon the radially exteding surfaces of the discs 11, 12 can be altered by the expedient of deforming the teeth 31 and 32. Stated in still another way, one can achieve a hysteresis-free modulation of the magnitude of transmitted torque by employing clutch discs 11, 12 at least some of which have at least slightly elastic teeth. 31 or 32 and/or by employing hubs at least one of which has at least slightly elastic splines 15 or 14.

The thickness of the annular main portion 11a of each clutch disc 11 preferably exceeds the corresponding dimensions of the teeth 31 (i.e., as measured in the axial direction of the shaft 2 when the disc clutch 1 is assembled). This can be seen in FIG. 4 which shows that the thickness of a tooth 31 can amount to a relatively small fraction (e.g., 50%) of the thickness of the annular portion 11a. The transitions between the annular portion 11a and the teeth 31 at the annular internal surface 11b of the annular portion 11a are or can be gradual, and the teeth 31 can be disposed at least substantially midway between the torque receiving or torque transmitting radial surfaces 11c of each clutch disc 11. Such dimensioning of the annular portions 11a and of the teeth 31 influences the elasticity of the teeth. The elasticity is further influenced by the configuration of teeth 31 as seen in the circumferential direction of the annular portion 11a (see FIG. 3).

FIG. 3 shows that each tooth 31 includes a radially inwardly extending first portion 32a which (in the illustrated embodiment) resembles a truncated pyramid, and an elongated tongue- or prong-shaped second portion 32b which extends along the internal surface 11b of the annular portion 11a in the circumferential direction of the disc 11 and is or can be separated from the internal surface 11b by a narrow clearance or gap 32c. The length of the second portion 32b can exceed (e.g., by 100%) the corresponding dimension of the first portion 32a. As shown at 33, the entire tooth 31 tapers in a direction from the annular portion 11a toward the axis of the clutch disc 11. Such configuration and dimensioning of the teeth 31 also contribute to the desired elasticity, i.e., to the ability of the annular main portion or section 11a to move axially of the hubs 8, 13 while the axial positions of the respective teeth 31 remain unchanged.

The configuration of the discs 12 is or can be analogous to that of the discs 11. The main difference is that the first portions 32a of the teeth 32 taper (at 33) radially outwardly, i.e., away from the external surfaces 12b of the annular main portions 12a. FIG. 5 shows that the discs 12 can be made of a suitable plastic material.

When the power train embodying the disc clutch 1 is in use, the shaft 2 is driven by the prime mover of the motor vehicle, e.g., an internal combustion engine, an electric motor or a hybrid prime mover. Since the clutch 1 rotates about the axis X of the shaft 2, the body of hydraulic fluid in the plenum chamber 27 also rotates and is simultaneously acted upon by centrifugal force. The shaft 2 is provided with a second axially extending blind bore or channel 35 which surrounds or is parallel to the channel 24 and supplies a stream or flow of a hydraulic fluid serving to perform a plurality of functions. One such function is to cool the package of discs 11, 12, i.e., to withdraw heat which is generated when the discs 11 and 12 are caused or permitted to slide relative to each other.

The channel 35 supplies coolant to one or more radially extending bores or ports 36 which divert the inflowing coolant radially outwardly (see the arrow 51 in FIG. 2) into one or more passages 38 at or in the radially innermost portion of the dished member 20. The coolant flows along the right-hand side of the member 20 and into axially parallel openings 39 of the annular stop 16 which can be said to constitute the other end wall of the cylinder for the piston 28. The coolant which has entered the annular space between the outer side of the annular stop 16 and the inner side of the end wall 10a of the housing 10 withdraws heat from the package of discs 11, 12 and is evacuated via openings 10b in the housing 10. Such coolant can dissipate heat (e.g., by being compelled to flow through a heat exchanger) prior to reintroduction into the channel 35.

A certain percentage of coolant flowing outwardly through the ports 36 enters a second annular chamber 37 which is located between the diaphragm spring 21 and the dished member 20. Such coolant can be a viscous fluid which is branched off the stream of fluid flowing into the plenum chamber 27 when the control system for the clutch 1 is to alter the magnitude of the torque being transmitted by the discs 11, 12.

If the RPM of the shaft 2 is increased, the pressure of fluid (coolant) upon the membrane 23 increases with the square of the increase of RPM. In the absence of any undertaking to the contrary, such increase of fluid pressure upon the membrane 23 could entail a change in the axial position of the piston 28 and hence an undesirable change in the magnitude of the torque being transmitted by the package of clutch discs 11, 12. In accordance with another desirable feature of the present invention, a further function of the fluid (coolant) being supplied by the channel 35 is to counteract the tendency of the piston 28 to bring about undesirable changes in the magnitude of forces being transmitted by the abutting surfaces of the discs 11 and 12. For example, the hydraulic fluid which is supplied by the pump to the channels 24, 35 can constitute a so-called ATF (automatic transmission fluid) oil, and such fluid is utilized to neutralize the effect of the circulating body of fluid in the plenum chamber 27 upon the piston 28. Thus, that portion of the fluid being admitted via channel 35 which is not utilized to cool the discs 11, 12 (i.e., which is not evacuated via passage(s) 38, is caused to enter the second chamber 37 wherein it is set in rotary motion and exerts pressure upon the diaphragm spring 21.

Figure 6:
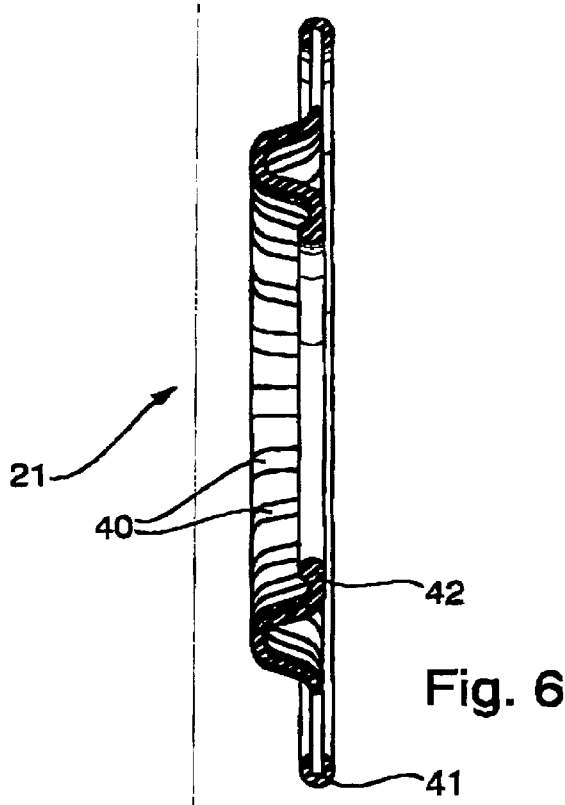
FIG. 6 is an axial sectional view of a diaphragm spring which is utilized in the disc clutch of FIG. 1.

As shown in FIGS. 2 and 6, the diaphragm spring 21 comprises a radially outermost portion 41 within the confines of the hub 8 and an inner portion including radially inwardly extending tongues or prongs defining radially extending slots 40. The enlarged radially innermost portions of the prongs constitute or form part of the aforementioned sealing member 29. The slots are filled with a sealant 42, e.g., a layer or film of fluorosilicone caoutchouc applied to one side of that portion of the diaphragm spring 21 which is provided with the slots 40. The layer of sealant 42 can constitute a washer-like body which adheres to one side of the diaphragm spring 21.

A second annular layer of sealant is or can be provided to surround the exposed surface of the radially outer annular portion 41 of the diaphragm spring 21. Such annular portion 41 is sealingly confined in the annular channel of the radially outermost portion of the dished annular member 20. This ensures that the second chamber 37 can also constitute a plenum chamber which can confine the fluid at an elevated pressure in the same way as the plenum chamber 27. The circulating fluid which fills the chamber 37 acts upon the diaphragm spring 21 to ensure that the latter can effectively resist the tendency of the piston 28 to carry out undesirable axial movements under the influence of the body of fluid which circulates in the chamber 27, i.e., under that influence of the body of fluid in the chamber 27 which is attributable to the action of centrifugal force. The effective surface of the diaphragm spring 21 (i.e., that area of the right-hand surface of this spring which is being acted upon by fluid in the chamber 37) is or can be identical with or can closely approximate the effective surface of the piston 28; this ensures that the pressure of fluid upon the spring 21 in the chamber 37 counteracts and balances the circulation-induced pressure of fluid in the plenum chamber 27 upon the piston 28. Thus, the piston 28 changes its axial position only when the quantity of fluid in the chamber 27 changes but not under the influence of fluid pressure which is attributable to the fact that the fluid in the chamber 27 circulates in response to rotation of the clutch 1. This is desirable and advantageous on the ground that the piston 28 effects a change in the magnitude of torque being transmitted by the package of discs 11, 12 only when the pump causes a change in the quantity of fluid in the plenum chamber 27. It has been found that such design of the means for engaging and disengaging the clutch 1 contributes significantly to the accuracy of adjustments of transmitted torque.

An advantage of a sealant which fills the slots 40 between the prongs of the diaphragm spring 21 and consists of fluorosolicate caoutchouc or an equivalent material is that it does not exert a negative influence upon the movements of the diaphragm spring.

A desirable feature of the improved disc clutch 1 is that its regulation (i.e., the magnitude of transmitted torque) is not influenced at all, or is not unduly influenced by hysteresis. This is attributable, at least to a high degree, to the afore-discussed elasticity of the teeth 31, 32 of the respective clutch discs 11, 12 so that such discs can move axially of the hubs 8, 13 even when the teeth 31, 32 are frictionally held against axial movement along the neighboring splines 15, 14. Of course, the teeth 31, 32 will move axially of the clutch 1 when the piston 28 is to cover a greater distance along the shaft 2, e.g., to engage the clutch; however, any minor or minute adjustments of the extent of engagement of the clutch do not necessitate actual axial displacements of the teeth 31, 32 along the respective of splines 15, 14. Thus, frictional engagement between the faces of the teeth 31, 32 and the adjacent faces of the splines 15, 14 can no longer adversely influence the accuracy of adjustment of the forces being transmitted by abutting major surfaces of the clutch discs 11 and 12.

The flow of fluid is preferably regulated in such a way that the fluid flows through the channel 35 into the bore or bores 36 when the clutch 1 is engaged. When this clutch is disengaged and the motor vehicle is to move rearwardly, the fluid flows to the aforementioned other clutch which, as a rule, is installed radially outwardly of the housing 10. If neither of the two clutches is to be engaged, the fluid which is supplied by the pump is simply recirculated to the source, e.g., to a sump which supplies fluid to the pump.

The passage or passages 38 in the dished annular member 20 are relatively small, i.e., this member can act as a flow restrictor to ensure adequate filling of the second chamber 37.

If the piston 28 (including the pressure plate 9) is being acted upon by pressurized fluid in the chamber 27, the radially innermost portion of the piston exposes a passage or path along the supporting ring 22. Such passage is located radially outwardly of the passage 38; this ensures that the fluid flows in the direction of arrow 50, i.e., into the clutch 1.

The improved clutch is susceptible of numerous modifications without departing from the spirit of the present invention. For example, the annular main portions 11a and/or 12a of the clutch discs 11, 12 can be made of a first material (such as sheet steel), and the teeth 31 and/or 32 can constitute separately produced parts which are thereupon bonded, mechanically secured or otherwise affixed to the respective annular main portions.

The feature which is shown in FIG. 4, namely that the annular main portion (11a) is thicker than the respective teeth (31), is particularly desirable if the main portions are made of a relatively thick and rigid material. However, if the annular main portions 11a and/or 12a are relatively thin or very thin, the thicknesses of the teeth 31 and/or 32 can match the thicknesses of the respective main portions.

The annular main portions 11a and/or 12a can be provided with suitable friction linings, not shown. For example, friction linings can be provided only on one or on both major surfaces of each annular main portion 11a and/or 12a.

The provision of gradual transitions between the annular portion 11a and/or 12a and the respective teeth 31 and/or 32 is desirable because such design of the discs 11 and/or 12 reduces the likelihood of stress concentration (also called notch effect) in the regions where the teeth are integrally or otherwise connected with the respective annular main portions (11a or 12a).

The magnitude of the torque which is being transmitted between the annular main portions 11a, 12a of neighboring clutch discs (i.e., between the hubs 8 and 13) is dependent upon the extent of friction between the abutting surfaces of neighboring discs. On the other hand, the forces acting between the teeth 31, 32 and the respective annular portions 11a, 12a act in the circumferential directions of the respective clutch discs. Thus, the splines 14, 15 which flank the respective teeth 32, 31 exert upon each tooth a pressure which can be reduced or controlled by providing the teeth 31 and/or 32 with films or layers of suitable elastic material; such films come into direct contact with the faces of the adjacent splines. It is equally possible to provide such elastic films on the faces of the splines 14 and/or 15. For example, the just discussed films can be made of the same material as the sealers 42 on the diaphragm spring 21.

The provision of the aforediscussed extensions 32b on the teeth 31 and/or 32 also contributes to the yieldability of such teeth in the circumferential direction of the clutch discs 11 and/or 12 when these discs are called upon to transmit torque between the hubs 8 and 13. For example, the discs 11, 12 can be made with relatively long radially outwardly (32) or radially inwardly (31) extending teeth, and such long teeth are thereupon flexed through 90° to form the respective portions 32a and 32b prior to bringing the thus shortened teeth into mesh with the splines 14 or 15.

FIGS. 3 and 5 further show that the portions 32b of the respective teeth 31, 32 have an arcuate shape, i.e., a curvature which can conform to that of adjacent portions of the respective surfaces 11b, 12b. In other words, the width of the clearances or gaps 32c is or can be constant and the radially inner faces of the tooth portions 32b can be parallel with the radially outer faces of such tooth portions.

It is often preferred to make the discs 11 and 12 of elastically deformable sheet steel. As mentioned hereinbefore, the radially extending major surfaces of the annular portions 12a can be provided with friction linings but the annular portions 11a of the discs 11 need not always be provided with such friction linings. However, it is also possible to provide at least one major surface of each of the annular portions 11a, 12a with a friction lining of the type customarily employed in many conventional disc clutches. Alternatively, at least one major surface 11c of each annular portion 11a can carry a friction lining but the major surfaces of the annular portions 12a can be devoid of such friction linings.

An advantage of the membrane 23 is that it shields the piston 28 from direct contact with the body of fluid in the plenum chamber 27. The operation of the membrane is free of hysteresis which is of considerable advantage for reasons already explained hereinbefore. A membrane which is provided with one or more annular corrugations 30 exhibits the advantage that the membrane can conform to the outline of the adjacent side of the piston 28 with a minimum of resistance as soon as the chamber 27 receives a body of hydraulic fluid, i.e., the membrane offers no resistance or negligible resistance to deformation by the fluid in the chamber 27.

Highly satisfactory results were obtained with membranes which were dimensioned, installed and made in such a way that they were capable of axial movement (in the plenum chamber 27) through distances in the range of up to 5 mm, especially 4 mm. The extent of axial movement of such a membrane during a minute adjustment of the torque being transmitted between the hubs 8 and 13 is but a fraction of the aforementioned maximum distance of about 4 mm. The provision of one or more corrugations 30 has been found to constitute a highly desirable feature of the improved membrane. Such corrugation or corrugations can be provided in the membrane 23 prior to installation in the disc clutch 1.

For example, a satisfactory membrane 23 can have a thickness of about 0.8 mm; this ensures that the action of pressurized hydraulic fluid upon one side of such membrane does not entail the development of pronounced elasticity-induced forces in the structure of the membrane. A suitable material for the making of the membrane is an elastomeric material, e.g., fluorosilicone caoutchouc; such material exhibits the advantage that it is immune to the action of available AFT fluids and/or other fluids which are often employed to engage or disengage a disc clutch.

It is also possible to employ a membrane which consists of or contains a metallic material. Furthermore a membrane which contains an elastomeric material can be reinforced, e.g., with a filamentary material such as glass fibers.

The provision of the clutch engaging and disengaging cylinder and piston unit which is provided with a plenum chamber (27) for the reciprocable piston (28), and which further comprises biasing means (such as the membrane 23 and the diaphragm spring 21) for the piston, as well as with the second chamber 37 exhibits the aforediscussed advantage that the diaphragm spring 21 can effectively neutralize those changes of fluid pressure in the chamber 27 which are attributable to the action of centrifugal force. Such pressure changes (also called rotation-induced pressure) could affect the accuracy of adjustment or selection of the magnitude of torque which is to be transmitted between the hubs 8 and 13. The rotation-induced changes of fluid pressure in the second chamber 37 are taken advantage of to counteract the rotation-induced changes of fluid pressure in the plenum chamber 27 so that the piston 28 responds only to those changes of fluid pressure in the chamber 27 which are brought about on purpose, namely by fluid flowing into or from the chamber 27 through the port or ports 26.

The diaphragm spring 21 performs the function of urging the piston 28 to its starting position, corresponding to the disengaged condition of the clutch 1, as well as the function of applying to the piston 28 a force which is generated by centrifugal force acting upon the circulating body of fluid in the second chamber 37 to counteract the aforediscussed force generated by the fluid in the plenum chamber 27 under action of centrifugal force.

That portion of the diaphragm spring 21 which is subjected to the action of pronounced forces can be stabilized to an extent which is necessary to protect such portion against damage or destruction in actual use of the clutch 1. For example, the radially outermost portion of the diaphragm spring 21 can be mechanically reinforced by the provision of an annular insert which is at least partially embedded into the aforediscussed elastic sealer 42. The reinforcing insert can be embedded in the radially innermost and/or in the radially outermost portion of the spring 21; the insert or inserts can be made of a suitable synthetic plastic material. For example, the incorporation of one or more annular reinforcing inserts can prolong the useful life of the diaphragm spring 21 by reducing the likelihood of destruction of elastic sealer 42 in the region of the slots 40 between the radial tongues or prongs extending inwardly from the circumferentially complete radially outer portion 41 of the diaphragm spring.

Each reinforcing insert can cause the respective (inner and/or outer) marginal portion of the membrane 23 to exhibit a circumferentially complete bead which can be received (by snap action and/or otherwise) in the adjacent portion of the cylinder for the reciprocable piston 28. FIG. 2 shows that the radially outer marginal bead of the membrane 23 is recessed into the adjacent radially outermost portion of the flange or end wall 5; the bead along the radially inner marginal portion is located between the supporting ring 22 and the radially innermost portion of the flange 5.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of disc clutches and, therefore, such adaptations should and are intended to be comprehended within the meaning and range of equivalence of the appended claims.

What is claimed is:

1. A disc clutch, comprising:
   a first hub having external splines and being rotatable about a predetermined axis;
   a second rotary hub spacedly surrounding and being coaxial with said first hub and having internal splines;
   first friction generating means including at least one first annular clutch disc having a set of internal teeth mating with said external splines;
   second friction generating means including at least one second annular clutch disc having a set of external teeth mating with said internal splines, the teeth of at least one of said sets of teeth being deformable and being movable axially of said hubs, the teeth of said at least one set of teeth being resilient; and
   operating means actuatable to engage and disengage the clutch, including means for biasing said discs against each other, wherein each of said clutch discs further includes an annular section having a first thickness as seen in the direction of said axis, the teeth of at least one of said discs having a second thickness different from said first thickness.

2. The clutch of claim 1, wherein at least one of said friction generating means includes at least two clutch discs flanking the at least one clutch disc of the other of said friction generating means.

3. The clutch of claim 1, further comprising means for rotating one of said hubs, including a prime mover in the power train of a motor vehicle.

4. The clutch of claim 1, wherein said biasing means comprises at least one fluid-operated cylinder and piston unit.

5. The clutch of claim 1, wherein the teeth of said at least one set of teeth are resiliently deformable in the direction of said axis.

6. The clutch of claim 1, wherein said at least one first clutch disc has an internal surface and said resilient teeth are said internal teeth, said internal teeth extending toward said axis beyond said internal surface and into mesh with said external splines.

7. The clutch of claim 1, wherein said at least one second clutch disc has an external surface and said resilient teeth are said external teeth, said external teeth extending away from said axis beyond said external surface into mesh with said internal splines.

8. The clutch of claim 1, wherein the teeth of at least one of said sets are a tight sliding fit between the respective splines.

9. The clutch of claim 1, wherein the teeth of at least one of said sets are in wobble-free mesh with the respective splines.

10. The clutch of claim 1, wherein the teeth of the set forming part of said at least one of said clutch discs are of one piece with the respective annular section.

11. The clutch of claim 1, wherein said second thickness is less than said first thickness.

12. The clutch of claim 1, wherein the teeth of at least one of said discs merge radially into the respective annular section.

13. The clutch of claim 1, wherein the teeth of at least one of said discs include first portions affixed to the respective annular section and second portions extending from the respective first portions substantially in a circumferentially direction of the respective disc.

14. The disc clutch of claim 13, wherein said first portions taper in directions substantially radially of said axis and away from the respective annular section.

15. The clutch of claim 1, wherein said teeth have tooth faces which exert a pressure upon and are slidable along the splines of the respective hubs, and further comprising means for reducing the pressure between the tooth faces of at least one set of teeth and the respective splines.

16. The clutch of claim 15, wherein said pressure reducing means comprises elastic films on the faces of said at least one set of teeth.

17. The clutch of claim 15, wherein each of said discs further includes an annular section and the teeth of said at least one set include first portions integral with the respective annular section and second portions integral with the respective first portions and extending along the neighboring splines of the respective hub in the direction of said axis, said second portions forming part of said pressure reducing means.

18. The clutch of claim 1, wherein the teeth of at least one of said sets of teeth contain spring steel.

19. The clutch of claim 1, wherein said at least one second clutch disc comprises friction linings frictionally engaging said at least one first clutch disc in the engaged condition of the clutch.

20. The clutch of claim 19, wherein said at least one first clutch disc is devoid of friction linings.

21. The clutch disc of claim 1, wherein said biasing means comprises at least one cylinder and piston unit including a movable piston and defining a plenum chamber for a supply of fluid, said biasing means further including a membrane disposed in said chamber between the supply of fluid and said piston.

22. The clutch of claim 21, wherein the fluid is a hydraulic fluid.

23. The clutch of claim 21, wherein said membrane has an at least substantially annular shape.

24. The clutch of claim 21, wherein said membrane has a marginal portion sealingly engaging the cylinder of said unit between said piston and the supply of fluid in said chamber.

25. The clutch of claim 21, wherein said membrane has an at least substantially annular shape and includes an inner and an outer marginal portion, at least one of said marginal portions having a bead sealingly engaging the cylinder of said unit.

26. The clutch of claim 25, wherein said cylinder has an annular socket for said bead.

27. The clutch of claim 21, wherein said membrane has at least one prefabricated annular corrugation adjacent said piston.

28. The clutch of claim 21, wherein said membrane is deformable in the direction of said axis through a distance of up to about 5 mm in response to movement of said piston relative to the cylinder of said unit in a direction to pressurize the supply of fluid in said chamber.

29. The clutch of claim 21, wherein at least a major portion of said membrane has a thickness of approximately 0.8 mm.

30. The clutch of claim 21, wherein at least a portion of said membrane consists of an elastomeric material.

31. The clutch of claim 30, wherein said elastomeric material of said membrane includes fluorosilicone caoutchouc.

32. The clutch of claim 21, wherein said membrane contains a metallic material.

33. The clutch of claim 21, wherein said membrane contains a reinforcing material.

34. The clutch of claim 33, wherein said reinforcing material includes a filamentary material.

35. The clutch of claim 1, wherein said biasing means comprises at least one fluid-operated cylinder and piston unit having a plenum chamber for a supply of hydraulic fluid arranged to bear upon the piston of said unit to thus shift the piston in the cylinder of said unit to thus shift the piston in the cylinder of said unit in a direction to at least partially engage the clutch, the fluid in said chamber being acted upon by centrifugal force when said hubs rotate to thus bias said piston in said direction and further comprising means for counteracting said bias upon said piston.

36. The clutch of claim 35, wherein said counteracting means defines a second chamber provided in said unit and a supply of a fluid medium in said second chamber, said supply of fluid medium being acted upon by centrifugal force when said hubs rotate to thus bias said piston counter to said direction.

37. The clutch of claim 36, wherein said supply of fluid medium is a coolant for said discs, and further comprising means for directing said coolant into heat-exchanging contact with said discs.

38. The clutch of claim 36, wherein said piston has a first effective surface being acted upon by fluid medium in said plenum chamber and said counteracting means includes a piston member provided in said unit adjacent said second chamber, said piston member having a second effective surface with an area at least approximating that of said first effective surface and being acted upon by the fluid medium in said second chamber to oppose the bias upon the piston of said at least one cylinder and piston unit when said hubs rotate.

39. The clutch of claim 38, wherein said piston member includes a prestressed diaphragm spring which biases said piston counter to said direction.

40. The clutch of claim 39, wherein said diaphragm spring includes a circumferentially complete annular portion and prongs extending from said annular portion substantially radially toward said axis, said prongs defining slots and said diaphragm spring further comprising a sealant at said slots.

41. The clutch of claim 40, wherein said diaphragm spring has a first side and a second side and said sealant coats at least a portion of at least one side of said diaphragm spring.

42. The clutch of claim 40, wherein said sealant contains an elastomeric material.

43. The clutch of claim 42, wherein said sealant contains fluorosilicone caoutchouc.

44. The clutch of claim 39, wherein said diaphragm spring has a circular shape and includes a radially outer portion and prongs extending from said radially outer portion substantially radially inwardly toward said axis, and further comprising a sealant coating at least a portion of said diaphragm spring at least in the region of said prongs.

45. The clutch of claim 39, further comprising at least one sealing device cooperating with at least one of said piston and said diaphragm spring to at least partially seal said second chamber from the surrounding atmosphere.

46. The clutch of claim 1, wherein the operating means includes means for biasing said discs against each other, said biasing means comprising at least one cylinder and piston unit including a movable piston and defining a plenum chamber for a supply of fluid, said unit further including a membrane disposed in said chamber between the supply of fluid and said piston.

47. The clutch of claim 1, wherein the operating means includes means for biasing said discs against each other, said biasing means comprising at least one fluid-operated cylinder and piston unit having a plenum chamber for a supply of hydraulic fluid arranged to bear upon the piston of said unit and to thus shift the piston in the cylinder of said unit in the direction of said axis to thus at least partly engage the clutch, the fluid in said chamber being acted upon by centrifugal force when said hubs rotate to thus bias said piston in said direction; and means for counteracting said bias upon said piston.

* * * * *

UNITED STATES PATENT AND TRADEMARK OFFICE
CERTIFICATE OF CORRECTION

PATENT NO. : 6,347,695 B1
DATED : February 19, 2002
INVENTOR(S) : Peter Kuhn, Frank Obrist and Oswald Friedmann It is certified that error appears in the above-identified patent and that said Letters Patent is hereby corrected as shown below:

<u>Title page,</u>
Item [73], Assignee, delete "LuK Lammellen, Buhl; Kupplungsbau GmbH, Baden, both of (DE)" and substitute -- LuK Lamellen und Kupplungsbau GmbH, Buhl/Baden, DE --.

Signed and Sealed this

Twenty-fourth Day of September, 2002

*Attest:*

JAMES E. ROGAN
*Attesting Officer*   *Director of the United States Patent and Trademark Office*